United States Patent
Lozano et al.

(10) Patent No.: US 10,308,377 B2
(45) Date of Patent: Jun. 4, 2019

(54) PROPELLANT TANK AND LOADING FOR ELECTROSPRAY THRUSTER

(71) Applicant: Massachusetts Institute of Technology, Cambridge, MA (US)

(72) Inventors: Paulo C. Lozano, Arlington, MA (US); Corey Patrick Fucetola, Somerville, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 541 days.

(21) Appl. No.: 14/681,264

(22) Filed: Apr. 8, 2015

(65) Prior Publication Data

US 2016/0297549 A1    Oct. 13, 2016

(51) Int. Cl.
*B64G 1/40* (2006.01)
*F03H 1/00* (2006.01)

(52) U.S. Cl.
CPC ........... *B64G 1/405* (2013.01); *F03H 1/0012* (2013.01)

(58) Field of Classification Search
CPC ........ F03H 1/005; F03H 1/0012; H01J 27/26; B64G 1/405
See application file for complete search history.

(56) References Cited

U.S. PATENT DOCUMENTS

| 3,486,302 | A | * | 12/1969 | Paynter | .................. F02K 9/605 55/431 |
| 4,855,604 | A | * | 8/1989 | Riahi | ..................... H01J 37/08 250/288 |
| 5,018,634 | A | | 5/1991 | Le Touche | |
| 5,279,323 | A | * | 1/1994 | Grove | ...................... F17C 9/00 137/154 |

(Continued)

FOREIGN PATENT DOCUMENTS

WO    WO 2002/055990 A2    7/2002
WO    WO 2006/009854 A2    1/2006

(Continued)

OTHER PUBLICATIONS

Kobayashi "Growth of large-diameter (4 nm) single-wall carbon nanotubes in the nanospace of mesoporous material SBA-15" 2011.*

(Continued)

*Primary Examiner* — Gerald L Sung
*Assistant Examiner* — William Breazeal
(74) *Attorney, Agent, or Firm* — Wolf, Greenfield & Sacks, P.C.

(57) ABSTRACT

Methods and apparatus of adding propellant to a thruster assembly are described. A first end of a beaker is disposed in an opening of the tank, where the beaker contains propellant and the first end of the beaker includes a break-away bottom. The thruster assembly and beaker are placed in a first environment, where the first environment is sub- (Continued)

stantially a vacuum and/or an environment composed substantially of gases that can be absorbed by the propellant. A plunger in the beaker is depressed to cause the breakaway bottom of the beaker to break and the propellant to flow into the tank of the thruster assembly. The thruster assembly is removed from the first environment and the beaker is removed from the opening. A cap is added to complete the assembly. The assembly contains a vent to allow gases to escape the interior of the tank.

23 Claims, 7 Drawing Sheets

(56) References Cited

U.S. PATENT DOCUMENTS

| | | | |
|---|---|---|---|
| 5,624,875 | A | 4/1997 | Nakanishi et al. |
| 6,068,882 | A | 5/2000 | Ryu |
| 6,288,390 | B1 | 9/2001 | Siuzdak et al. |
| 6,297,499 | B1 | 10/2001 | Fenn |
| 6,707,035 | B2 | 3/2004 | Hughey et al. |
| 6,768,119 | B2 | 7/2004 | de la Mora et al. |
| 6,867,415 | B2 | 3/2005 | Hughey et al. |
| 7,015,046 | B2 | 3/2006 | Wohlstadter et al. |
| 7,097,781 | B2 | 8/2006 | Asakawa et al. |
| 7,129,513 | B2 | 10/2006 | Zhou et al. |
| 7,199,364 | B2 | 4/2007 | Thakur |
| 7,335,897 | B2 | 2/2008 | Takats et al. |
| 7,397,032 | B2 | 7/2008 | Zona et al. |
| 7,517,479 | B2 | 4/2009 | Bango et al. |
| 7,696,489 | B2 | 4/2010 | Pilz et al. |
| 7,863,581 | B2 | 1/2011 | Lozano et al. |
| 7,932,492 | B2 | 4/2011 | Dammons et al. |
| 8,030,621 | B2 | 10/2011 | Lozano et al. |
| 8,080,930 | B2 | 12/2011 | King |
| 8,084,735 | B2 | 12/2011 | Kertesz et al. |
| 8,198,106 | B2 | 6/2012 | Akinwande et al. |
| 8,207,496 | B2 | 6/2012 | Makarov et al. |
| 8,227,765 | B2 | 7/2012 | Syms |
| 8,272,345 | B2 | 9/2012 | Robertson et al. |
| 8,324,593 | B2 | 12/2012 | Lozano et al. |
| 8,368,295 | B2 | 2/2013 | Wei et al. |
| 8,394,877 | B2 | 3/2013 | Asakawa et al. |
| 8,722,323 | B2 | 5/2014 | Wohlstadter et al. |
| 8,785,881 | B2 | 7/2014 | Lozano et al. |
| 8,791,411 | B2 | 7/2014 | Lozano et al. |
| 8,850,792 | B2 | 10/2014 | Marrese-Reading et al. |
| 9,194,379 | B1* | 11/2015 | Biblarz .............. F03H 1/00 |
| 9,358,556 | B2 | 6/2016 | Velásquez-Garcia et al. |
| 9,362,097 | B2 | 6/2016 | Lozano et al. |
| 9,460,884 | B2 | 10/2016 | Hopwood |
| 9,478,403 | B2 | 10/2016 | Lozano et al. |
| 9,669,416 | B2 | 6/2017 | Velasquez-Garcia et al. |
| 9,895,706 | B2 | 2/2018 | Velasquez-Garcia et al. |
| 9,905,392 | B2 | 2/2018 | Lozano et al. |
| 2004/0194305 | A1 | 10/2004 | deRochemont et al. |
| 2005/0131163 | A1 | 6/2005 | Rhine et al. |
| 2005/0133372 | A1 | 6/2005 | Zhou et al. |
| 2005/0233085 | A1 | 10/2005 | Miller et al. |
| 2005/0269559 | A1 | 12/2005 | Zhou et al. |
| 2005/0281379 | A1 | 12/2005 | Qiu et al. |
| 2005/0287421 | A1 | 12/2005 | Simon et al. |
| 2007/0170056 | A1 | 7/2007 | Arnold et al. |
| 2007/0235647 | A1 | 10/2007 | Zona et al. |
| 2008/0011617 | A1 | 1/2008 | Struthers et al. |
| 2008/0051881 | A1 | 2/2008 | Feng et al. |
| 2008/0131615 | A1 | 6/2008 | Robertson et al. |
| 2008/0307766 | A1 | 12/2008 | Petras et al. |
| 2009/0032724 | A1 | 2/2009 | Lozano et al. |
| 2009/0072750 | A1 | 3/2009 | Akinwande et al. |
| 2009/0114838 | A1 | 5/2009 | Lozano et al. |
| 2009/0130380 | A1 | 5/2009 | Asakawa et al. |
| 2009/0224679 | A1 | 9/2009 | Pan et al. |
| 2009/0283824 | A1 | 11/2009 | Knight et al. |
| 2009/0309481 | A1 | 12/2009 | Chou et al. |
| 2010/0139823 | A1 | 6/2010 | Gash et al. |
| 2010/0201251 | A1 | 8/2010 | Park et al. |
| 2010/0209788 | A1* | 8/2010 | Yoon ............. H01M 8/04186 429/410 |
| 2010/0284735 | A1 | 11/2010 | Sievers et al. |
| 2010/0289413 | A1 | 11/2010 | Eden et al. |
| 2011/0037102 | A1 | 2/2011 | Tchertchian et al. |
| 2011/0079138 | A1 | 4/2011 | Storrie et al. |
| 2011/0079188 | A1 | 4/2011 | Meintschel et al. |
| 2011/0124116 | A1 | 5/2011 | Wohlstadter et al. |
| 2011/0126929 | A1 | 6/2011 | Velasquez-Garcia et al. |
| 2011/0150765 | A1 | 6/2011 | Boyden et al. |
| 2011/0210265 | A1 | 9/2011 | Lozano et al. |
| 2011/0217544 | A1 | 9/2011 | Young et al. |
| 2011/0284735 | A1 | 11/2011 | Van Berkel et al. |
| 2012/0024421 | A1 | 2/2012 | Boutet et al. |
| 2012/0037595 | A1 | 2/2012 | Asakawa et al. |
| 2012/0045863 | A1 | 2/2012 | Hopwood |
| 2012/0104554 | A1 | 5/2012 | Eden et al. |
| 2012/0119079 | A1 | 5/2012 | Ouyang et al. |
| 2012/0144796 | A1 | 6/2012 | Marrese-Reading et al. |
| 2012/0189836 | A1 | 7/2012 | Kruglick |
| 2012/0244291 | A1 | 9/2012 | Bisht et al. |
| 2012/0301981 | A1 | 11/2012 | Ozgur et al. |
| 2012/0304618 | A1* | 12/2012 | Roy .............. F03H 1/00 60/203.1 |
| 2013/0098774 | A1 | 4/2013 | Lozano et al. |
| 2013/0113370 | A1 | 5/2013 | Tabib-Azar et al. |
| 2013/0228700 | A1 | 9/2013 | Lozano et al. |
| 2013/0241115 | A1 | 9/2013 | Sharma et al. |
| 2013/0256535 | A1 | 10/2013 | Meijer et al. |
| 2013/0319599 | A1 | 12/2013 | Huang et al. |
| 2014/0054809 | A1* | 2/2014 | Lozano et al. ......... H01J 37/08 264/28 |
| 2014/0110661 | A1 | 4/2014 | Wang et al. |
| 2014/0284406 | A1 | 9/2014 | Brekenfeld et al. |
| 2014/0292180 | A1 | 10/2014 | Park et al. |
| 2014/0353397 | A1 | 12/2014 | Velásquez-Garcia et al. |
| 2014/0353860 | A1 | 12/2014 | Velásquez-Garcia et al. |
| 2015/0060757 | A1 | 3/2015 | Lee et al. |
| 2015/0061487 | A1 | 3/2015 | Sharifi et al. |
| 2015/0170865 | A1 | 6/2015 | Lozano et al. |
| 2015/0255241 | A1 | 9/2015 | Bonam |
| 2016/0096185 | A1 | 4/2016 | Nobuo et al. |
| 2016/0107178 | A1 | 4/2016 | Velásquez-Garcia et al. |
| 2016/0111242 | A1 | 4/2016 | Lozano et al. |
| 2016/0318048 | A1 | 11/2016 | Velásquez-Garcia et al. |
| 2016/0376150 | A1 | 12/2016 | Lozano et al. |
| 2017/0110284 | A1 | 4/2017 | Lozano et al. |
| 2018/0076003 | A1 | 3/2018 | Lozano et al. |

FOREIGN PATENT DOCUMENTS

| | | |
|---|---|---|
| WO | WO 2007/002170 A2 | 1/2007 |
| WO | WO 2009/023257 A1 | 2/2009 |
| WO | WO 2009/039338 A1 | 3/2009 |
| WO | WO 2009/137583 A2 | 11/2009 |
| WO | WO 2011/079138 A2 | 6/2011 |
| WO | WO 2012/078043 A1 | 6/2012 |
| WO | WO 2013/003795 A1 | 1/2013 |
| WO | WO 2013/016497 A2 | 1/2013 |

OTHER PUBLICATIONS

Sefar "Common Metal Mesh Configurations" 2009.*
International Preliminary Report on Patentability dated Mar. 12, 2015 for Application No. PCT/US2013/057067.
International Preliminary Report on Patentability dated Nov. 18, 2010 for Application No. PCT/US2009/042990.
International Search Report and Written Opinion dated Jun. 17, 2010 for PCT/US2009/042990.
International Search Report and Written Opinion dated Oct. 9, 2014 for PCT/US2014/039851.
International Search Report and Written Opinion dated Mar. 21, 2014 for PCT/US2013/057067.
Bennett, Spinning a yarn, nano-style—more affordable fibres. Materials World Magazine. The Institute of Materials, Minerals and (56) References Cited

OTHER PUBLICATIONS

Mining. Jan. 7, 2013. 2 pages. <www.iom3.org/news/spinning-yarn-nano-style-affordable-fibres> Last accessed Jun. 5, 2013.
Burger et al., Nanofibrous materials and their applications. Annu. Rev. Mater. Res., No. 36 pp. 333-368, 2006.
Carretero et al., Numerical Simulation of Taylor Cone-Jets and Colloid Thruster Plumes. 4th International Conference on Spacecraft Proprulsion, Cagliari, Italy. Jun. 2-4, 2004.
Chang et al., Continuous near-field electrospinning for large area deposition of orderly nanofiber patterns. Appl. Phys. Lett. 93:123111 (2008).
Chiu et al., Mass Spectrometric Analysis of Colloid Thruster Ion Emission from Selected Propellants. Journal of Propulsion and Power. 2005. 21(3):416-23.
Clampitt et al., Intense Field-Emission Ion Source of Liquid Metals. J of Vaccum Science and Technology. 1975. 12 (1):1208.
Cleaver et al. A 100-Kv Ion Probe Microfabrication System with a Tetrode Gun. Vacuum Sci and Technol. 1981. 19(4): 1145-8.
Deitzel et al., Controlled deposition of electrospun poly( ethylene oxide) fibers Polymer No. 42 pp. 8163-8170, 2001.
Despois et al., Permeability of Open Pore Microcellular Materials. Acta Materialia. Elsevier, Oxford, GB. Mar. 2005. 53(5): 1381-8.
Doshi et al., Electrospinning process and applications of electrospun fibers, J Electrost. No. 35, pp. 151-160, 1995.
Driesel et al., In Situ Observation of the Tip Shape of Auge Liquid Alloy Ion Sources Using a High Voltage Transmission Electron Microscope. J. Vac. Sci. Technol. B. 1996. 14(5):3367-80.
Escher et al. Vaccuum Ion Emission From Solid Electrolytes: An Alternative Source for Focused Ion Beams. Applied Physics Letters. 2006. 89: 053513-1 and 053513-2.
Fernandez De La Mora, The Current Emitted by Highly Conductive Taylor Cones, J Fluid Mech. , vol. 260, pp. 155-184, 1994.
Fernandez De La Mora, The Fluid Dynamics of Taylor Cones, Annual Review of Fluid Mechanics, vol. 39: pp. 217-243 (2007).
Gassend et al., A Microfabricated Planar Electrospray Array Ionic Liquid Ion Source with Integrated Extractor, J. of Microelectromechanical Systems, vol. 18, No. 3, pp. 679-694, 2009.
Gassend et al., Precision In-Plane Hand Assembly of Bulk-Microfabricated Components for High Voltage MEMS Arrays Applications, J of Microelectromechanical Systems, vol. 18, No. 2, pp. 332-326 (2009).
Gibson et al., Transport properties of porous membranes based on electrospun fibers, Colloids and Surfaces A: Physicochemical and Engineering Aspects, No. 187-188, pp. 469-481 (2001).
Guharay et al., Characteristics of Focused Beam Spots Using Negative Ion Beams From A Compact Surface Plasma Source and Merits for New Applications. Journal of Vacuum Science and Technology B. 1998. 16(6): 3370-3.
Guzdar et al., Charging of substrates irradiated by particle beams. Applied Physics Letters. 1997. 71(22). 3302-4.
Hardesty, Making 'nanospinning' practical. MIT News Office. Nov. 20, 2012. 3 pages. <web.mit.edu/newsoffice/2012/making-nanospinning-practical-1120.html?tmpl=component&print=1> Last accessed May 31, 2013.
He et al., Magnetic and photomagnetic properties of polycrystalline wide-gap semiconductor $Cd_{1-x}Mn_xTe$ thin films. Journal of Electronic Materials. Feb. 1997. 26(2):73-7.
Hill et al., High-Throughput Ionic Liquid Electrospray Sources Based on Dense Monolithic Arrays of Emitters with Integrated Extractor Grid and Carbon Nanotube Flow Control Structures. Technical Digest of the 17th International Conference on Solid-State Sensors Actuators, and Microsystems. Barcelona, Spain. Jun. 16-20, 2013.
Ishino et al., Wicking within forests of micropillars, Europhysics Letters 79:56005 (2007).
Krpoun et al., Tailoring the hydraulic impedance of out-of-plane micromachined electrospray sources with integratedelectrodes. Appl. Phys. Lett., vol. 94, 2009.

Larriba et al., Monoenergentic Source of Kilodalton Ions from Taylor Cones of Ionic Liquids. Journal of Applied Physics. 2007. 101: 084303-1 to 084303-6.
Larrondo et al., Electrostatic fiber spinning from polymer melts—1. Experimental-observations on fiber formation and properties, J Polym. Sci. B 1No. 9, pp. 909-920 (1981).
Larsen et al., Use of Coaxial Gas Jackets to Stabilize Taylor Cones of Volatile Solutions and to Induce Particle-to-Fiber Transitions, Adv Mater vol. 16, No. 2, 166-169, (2004).
Lee et al., Developing protective textile materials as barriers to liquid penetration using melt electrospinning, Journal of Applied Polymer Science, vol. 102, pp. 3430-3437, (2006).
Legge et al., 18.086 Final Project: Finite Element Modelling of Ionic Liquid Flow Through Porous Electrospray Emitters. May 14, 2008.
Legge et al., Fabrication and Characterization of Porous Metal Emitters for Electrospray Thrusters. IEPC-2007-145 Proc. 30th International Electric Proulsion Conference, Florence, Italy, Sep. 17-20, 2007.
Legge et al., Electrospray propulsion based on emitters microfabricated in porous metals, J. Propul. Power, vol. 27, pp. 485-494, 2011.
Legge, Fabrication and Characterization of Porous Metal Emitters for Electrospray Applications. Brown University (Mechanical Engineering): Department of Aeronautics and Astronautics. May 18, 2008. 140 pages.
Li et al. The Focused-Ion-Beam-Microscope-More than a Precision Ion Milling Machine. JOM. 2006. 58 (3): 27-31.
Li et al., Electrospinning of nanofibers: reinventing the wheel? Advanced Materials, vol. 16, pp. 1151-1170, 2004.
Lin et al., Preparation of poly( ether sulfone) nanofibers by gas-jet/electrospinning, Journal of Applied Polymer Science, vol. 107, pp. 909-917, 2008.
Lozano et al., Electrospray Emission from Nonwetting Flat Dielectric Surfaces. Journal of Colloid and Interface Science. 2004. 276(2): 392-9.
Lozano et al., Energy Properties of an EMI-IM Ionic Liquid Ion Source. J Phys., D: Appl Phys. 2006. 39: 126-34.
Lozano et al., Experimental Measurements of Colloid Thurster plumes in the Ion-Droplet Mixed Regime. (AIAA-3814) 38th Joint Propulsion Conference. Indianapolis, Indiana. Jul. 7-10, 2002. 1-6.
Lozano et al., Ionic liquid ion sources: characterization of externally wetted emitters, J. Colloid Interf. Sci., vol. 282, pp. 415-421, 2005.
Lozano et al., Ionic liquid ion sources: Suppression of Electrochemical Reactions Using Voltage Alternation. J. Colloid Interf. Sci. 2004. vol. 280, pp. 149-154.
Lozano et al., On the Dynamic Response of Externally Wetted Ionic Liquid Ion Sources. J. Phys. D.: Appl Phys. 2005. 38(14).2371-7.
Lozano et al., Performance Characteristics of Linea Ionic Liquid Electrospray Thruster. IEPC-2005-192. 29th International Electric Propulsion Conference. Princeton University (USA). Oct. 21-Nov. 2005.
Lukas et al., Self-organization of jets in electrospinning from free liquid surface: A generalized approach J. Appl. Phys. 103:084309 (2008).
McEwen et al., Electrochemical Properties of Imidazolium Salt Electrochemical Capacitor Applications. J. Electrochecm Soc. 1999. 146(5): 1687-95.
Muhle et al., A Time-of-Flight Spectrometer for Investigations on Liquid Metal Ion Sources. J. Phys. D: Appl Physucs, 1999. 32(2): 161-7.
Paruchuri et al., Splitting of a Liquid Jet. Phys. Rev. Lett. vol. 98:134502, 2007.
Petrik et al., Production Nozzle-Less Electrospinning Nanofiber Technology. MRS Proceedings. 1240 1240-WW03-07 doi:10.1557/PROC-1240-WW03-07 (2009). 12 pages.
Podenok et al., Electric Field Enhancement Factors Around a Metallic, End-Capped Cylinder NANO 01 87-93 (2006).
Ponce De Leon et al., Batch-Microfabricated Arrays of Electrospinning Emitters for High Throughput Generation of Nanofibers. Technical Digest of the 12th International Workshop on Micro and Nanotechnology for Power Generation and Energy Conversion Applications. Atlanta GA, USA. pp. 227-230, Dec. 2-5, 2012.

(56) References Cited

OTHER PUBLICATIONS

Prewett et al., Focused Ion Beams from Liquid Metal Ion Sources. Research Studies Press. 1991. 19-30, 78-101 and 151-74.
Quéré, Wetting and Roughness. Annu. Rev. Mater. Res. 2008;38:71-99.
Reneker et al., Electrospinning jets and polymer nanofibers, Polymer, vol. 49, pp. 2387-2425, 2008.
Romero-Sanz et al., Source of heavy molecular ions based on Taylor cones of ionic liquids operating in the pure ion evaporation regime, J. Appl. Phys., vol. 94, pp. 3599-3605, 2003.
Scipioni et al., Performance of Multicusp Plasma Ion Sources for Focused Ion Beam Applications. Journal of Vacuum Science and Technology B. 2000. 18(6). 3194-7.
Seiwert et al., Coating of a textured solid. J. Fluid Mech. 669 55 (2011).
Smith et al. High Brightness Inductively Coupled Plasma Source for High Current Focused Ion Beam Applications. Journal of Vacuum Science and Technology B.2006. 24(6): 2902-6.
Srinivasan et al., Structure and Morphology of small diameter electrospun aramid fibers, Polymer International, No. 36, pp. 195-201, 1995.
Srivastava et al., Multi-jet electrospinning of conducting nanofibers from microfluidic manifolds, J Appl. Polymer Sci. vol. 106 pp. 3171-3178, 2007.
Suzuki et al., Contrast Differenes Between Scanning ION and Scanning Electron Microscope Images. Journal Vacuum Science and Technology A. 2004. 22(1): 49-52.
Swanson et al., Emission Characteristics of Fallium and Bismuth Liquid Metal Ion Sources. J. Vac. Sci. Technol. 1979. 16(6): 1864-9.
Szilagyi et al., Electron and Ion Optics, Plenum Press. 1988. 216-50 and 251-63.
Taylor, Disintegration of Water Drops in an Electric Field. Proc. R. Soc. London A 280 (1964) 383-397.
Teo et al., Uniform patterned growth of carbon nanotubes without surface carbon, Appl. Phys. Lett., vol. 79, pp. 1534-1536 (2001).
Thavasi et al., Electrospun Nanofibers in Energy and Environmental Applications. Energy Environ. Sci. 1 205-221. (2008).
Theron et al., Multiple jets in electrospinning: experiment and modeling, Polymer 46 2889-2899 (2005).
Tomaszewski et al., Investigation of electrospinning with the use of a multi jet electrospinning head, Fibres & Textiles in Eastern Europe, vol. 13, pp. 22-26, 2005.
Tseng et al. Recent Developments in Nanofabrication Using Focused Ion Beams. Small. 2005. 1(10):924-39.
Vaseashta, Controlled formation of multiple Taylor cones in electrospinning process, Applied Physics Letters, vol. 90, No. 9, 093115 (2007).
Velasquez-Garcia et al., A Micro-fabricated Linear Array of Electrospray Emitters for Thruster Applications, J. of Microelectromechanical Systems, vol. 15, No. 5, pp. 1260-1271 (2006).
Velasquez-Garcia et al., A Planar Array of Micro-fabricated Electrospray Emitters for Thruster Applications, J. of Microelectromechanical Systems, vol. 15, No. 5, pp. 1272-1280 (2006).
Velasquez-Garcia et al., An Application of 3D MEMS Packaging: Out-Of-Plane Quadrupole Mass Filters, Journal of Microelectromechanical Systems, vol. 16, No. 6, pp. 1430-1438 (2008).
Velasquez-Garcia et al., CNT-based MEMS Ionizers for Portable Mass Spectrometry Applications, J. of Microelectromechanical Systems, vol. 19,No. 3,pp. 484-493 (2010).
Velasquez-Garcia et al., Precision Hand Assembly of MEMS subsystems using DRIB-patterned deflection Spring Structures: An Example of an Out-of-plane Substrate Assembly, J of Microelectromechanical Systems, vol. 16, No. 3, pp. 598-612, Jun. 2007.
Xiao et al., Prediction and Optimization of Liquid Propagation in Micropillar Arrays, Langmuir 26 15070-15075 (2010).
Yang et al., Multiple Jets in Electrospinning Proceedings of the 8th International conference on properties and applications of dielectric materials, pp. 940-943 (2006).
Yang et al., Research Progress in Preparation and Application of Gradient-Porous Metal. Apr. 2008. Powder Metallurgy Industry. 18(7).
Yarin et al., Upward needleless electrospinning of multiple nanofibers, Polymer, vol. 45, pp. 2977-2980 (2004).
Yoshihiro et al., Characteristics of elastomeric nanofiber membranes produced by electrospinning, Journal of Textile Engineering, vol. 53, No. 4, (2007). 10 pages.
Zeng et al., Influence of Property Gradient on the Behavior of Cellular Materials Subjected to Impact Loading. AIP Conference Proceedings. AIP USA. Feb. 15, 2008. vol. 18.
Zhou et al., Gas flow-assisted alignment of super long electrospun nanofibers, J Nanosci. Nanotechnol. vol. 7, No. 8, pp. 2667-2673 (2007).
Zhou et al., Mass production of nanofiber assemblies by electrospinning, Polym Int, No. 58, pp. 331-342 (2009).
Zong et al., Control of structure, morphology and property in electrospun poly(glycolide-co-lactide) non-woven membranes via postdraw treatments, Polymer, vol. 44 pp. 4959-4967 (2003).
U.S. Appl. No. 13/918,759, filed Jun. 14, 2013, Velásquez-García et al.
U.S. Appl. No. 13/918,742, filed Jun. 14, 2013, Velásquez-García et al.
U.S. Appl. No. 13/681,155, filed Nov. 19, 2013, Lozano et al.
U.S. Appl. No. 14/336,814, filed Jul. 21, 2014, Lozano et al.
U.S. Appl. No. 14/661,855, filed Mar. 18, 2015, Lozano et al.
PCT/US2013/057067, Mar. 21, 2014, International Preliminary Report on Patentability.
PCT/US2009/042990, Nov. 18, 2010, International Preliminary Report on Patentability.
PCT/US2009/042990, Jun. 17, 2010, International Search Report and Written Opinion.
PCT/US2014/039851, Oct. 27, 2014, International Search Report and Written Opinion.
PCT/US2013/057067, Mar. 21, 2014, International Search Report and Written Opinion.
International Search Report and Written Opinion dated Sep. 15, 2015 for Application No. PCT/US2015/024827.
International Preliminary Report on Patentability dated Oct. 19, 2017 for Application No. PCT/US2015/024827.
International Preliminary Report on Patentability dated Dec. 10, 2015 for Application No. PCT/US2014/039851.
International Search Report and Written Opinion dated Nov. 23, 2015 for PCT/US2015/021277.
International Preliminary Report on Patentability dated Nov. 10, 2016 for Application No. PCT/US2015/021277.
Velásquez-García et al., Fabrication of large arrays of high-aspect-ratio single-crystal silicon columns with isolated vertically aligned multi-walled carbon nanotube tips. Nanotechnology. Oct. 8, 2008;19(40): 405305(1-6). doi:10.1088/0957-4484/19/40/405305.
Velásquez-García et al., SLA 3-D Printed Arrays of Miniaturized, Internally Fed, Polymer Electrospray Emitters. J of Microelectromechanical Systems. Dec. 2015;24(6):2117-2127, doi: 10.1109/JMEMS.2015.2475696.
Yamashita et al., Characteristics of elastomeric nanofiber membranes produced by electrospinning. Journal of Textile Engineering. Jan. 2007; 53(4):137-42. doi: 10.4188/jte.53.137.
Hemberger et al., Thermal transport properties of functionally graded carbon aerogels. Int J Thermophys. 2009;30:1357-71.

* cited by examiner

PROPELLANT TANK AND LOADING FOR ELECTROSPRAY THRUSTER

STATEMENT REGARDING FEDERALLY-SPONSORED RESEARCH OR DEVELOPMENT

This invention was made with government support under Grant No. NNL13AA12C awarded by NASA. The government has certain rights in the invention.

CROSS-REFERENCE TO RELATED APPLICATIONS

The contents of each of the following applications are incorporated herein by reference in their entirety: U.S. application Ser. No. 13/839,064, filed Mar. 15, 2013; U.S. patent application Ser. No. 13/681,155, filed on Nov. 19, 2012; and U.S. patent application Ser. No. 12/990,923, filed on May 3, 2011.

The technology generally relates to electrospray thrusters, and more specifically, to electrospray thruster tanks and methods and devices for loading propellant into electrospray thrusters.

BACKGROUND OF THE TECHNOLOGY

Ionic liquids (ILs) are molten salts at room temperature and exhibit extremely low vapor pressures. ILs are formed by positive and negative ions which can be directly extracted and accelerated to produce thrust when used in bipolar operation. ILs have been shown to emit a purely ionic current when exposed to a strong applied potential. ILs generate a substantially pure ionic emission and have a relatively low starting voltage (e.g., less than approximately 2 kV required to generate ions from the Taylor Cone). ILs allow for a scalable specific impulse of the electrospray emitter(s) from approximately 500 seconds to 5000+ seconds. Some ILs can display super-cooling tendencies in which they remain as liquids well below their nominal freezing points. Just as their inorganic cousins (simple salts like NaCl, KBr, etc.) at their melting points (typically >850° C.), ILs exhibit appreciable electrical conductivity at room temperature, making them suitable for electrostatic deformation and subsequent Taylor Cone formation. ILs are thermally stable over a wide range of temperatures (they do not boil, but decompose at temperatures ~250-500° C.) and are apparently non-toxic being able to be used with applications with green standards, such as in the synthesis and catalysis of chemical reactions. ILs have low vapor pressures at, or moderately above, their melting points. This allows for use in high vacuum equipment in open architectures such as externally wetted needles/emitters. Beneficially, ion sources using ILs can be used to provide thrust in a variety of applications.

SUMMARY OF THE TECHNOLOGY

In some applications, electrospray thrusters can use an array of needle-like tips in a porous substrate to emit ions, thereby providing thrust (e.g., to move small satellites). Ions can be delivered to the emitter tips by an ionic liquid propellant that is transported to the tips, e.g., by capillary forces. In some embodiments, the technology described herein relates to propellant tanks for electrospray thrusters and/or methods for filling such tanks with propellant. For example, some embodiments of the technology relate to propellant tanks for electrospray thrusters configured to permit gas to enter and leave the tanks in response to environmental changes. As another example, embodiments of the technology can provide methods and apparatus for adding propellant to electrospray thruster tanks by imbibing porous structures in electrospray thrusters with propellant (e.g., ionic liquid) while facilitating minimizing trapped gases in the porous structures.

In one aspect, there is a method of adding propellant to a thruster assembly, wherein the thruster assembly includes a tank including a first opening and a second opening; a porous emitter array disposed over the first opening; a porous reservoir disposed substantially within an interior of the tank, wherein the porous reservoir is in fluid communication with the porous emitter array through the first opening. The method includes disposing a first end of a beaker in the second opening of the tank, wherein the beaker contains propellant, and wherein the first end of the beaker includes a breakaway bottom. The method includes placing the thruster assembly and beaker in a first environment, wherein the first environment is one of a substantial vacuum and/or an environment composed substantially of gases that can be absorbed by the propellant. The method includes depressing a plunger in the beaker to cause the breakaway bottom of the beaker to break and cause the propellant to flow into the tank. The method includes removing the thruster assembly from the first environment. The method includes removing the beaker from the second opening.

In some embodiments, the method can include affixing a cap to the second opening of the tank. In some embodiments, the cap includes a porous membrane that permits gas to pass therethrough and blocks the propellant from passing therethrough. In some embodiments, first pores of the porous membrane are larger than second pores of the porous emitter array. In some embodiments, the porous membrane is made from at least one of Teflon, peek and polyethylene. In some embodiments, the tank includes a porous membrane that permits gas to pass therethrough and blocks the propellant from passing therethrough. In some embodiments, the method can include extending the plunger into the tank to compress the porous reservoir, thereby at least partially submerging the porous reservoir in the propellant and retracting the plunger from the tank.

In another aspect, there is an assembly. The assembly can include a thruster assembly. The thruster assembly can include a tank including a first opening and a second opening; a porous emitter array disposed over the first opening; and a porous reservoir disposed substantially within an interior of the tank, wherein the porous reservoir is in fluid communication with the porous emitter array through the first opening. The assembly can include a beaker having a first end including a breakaway bottom, wherein the first end of the beaker is disposed in the second opening.

In some embodiments, the beaker is filled with propellant. In some embodiments, the assembly includes a plunger disposed in the beaker to cause the breakaway bottom of the beaker to break and cause the propellant to flow into the tank when depressed.

In another aspect, there is a thruster assembly. The thruster assembly includes a tank including a first opening and a vent. The thruster assembly includes a porous emitter array disposed over the first opening. The thruster assembly includes a porous reservoir disposed substantially within an interior of the tank, wherein the porous reservoir is in fluid communication with the porous emitter array through the first opening.

In some embodiments, the vent includes a porous membrane that permits gas to pass therethrough and blocks a propellant from passing therethrough. In some embodiments, first pores of the porous membrane are larger than second pores of the porous emitter array. In some embodiments, the porous membrane is made from at least one of Teflon, peek and polyethylene.

In another aspect, there is a thruster assembly. The thruster assembly includes a tank including a first opening, wherein the tank is formed from one or more semi-permeable materials that permit gas to pass therethrough and block a propellant from passing therethrough. The thruster assembly includes a porous emitter array disposed over the first opening. The thruster assembly includes a porous reservoir disposed substantially within an interior of the tank, wherein the porous reservoir is in fluid communication with the porous emitter array through the first opening.

In some embodiments, first pores of the tank are larger than second pores of the porous emitter array. In some embodiments, the tank is formed from at least one of porous PTFE and/or hydrophobic solgel. In some embodiments, the thruster assembly can include a propellant container disposed within the interior of the tank, wherein the propellant container is formed from second one or more semi-permeable materials that permit gas to pass therethrough and block a propellant from passing therethrough; and wherein the porous reservoir is disposed partially within an interior of the propellant container. In some embodiments, first pores of the propellant container are larger than second pores of the porous emitter array. In some embodiments, the propellant container is formed from at least one of porous PTFE or hydrophobic solgel.

Other aspects and advantages of the technology can become apparent from the following drawings and description, all of which illustrate the principles of the technology, by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION OF THE TECHNOLOGY

Electrospray Thruster

Figure 1:
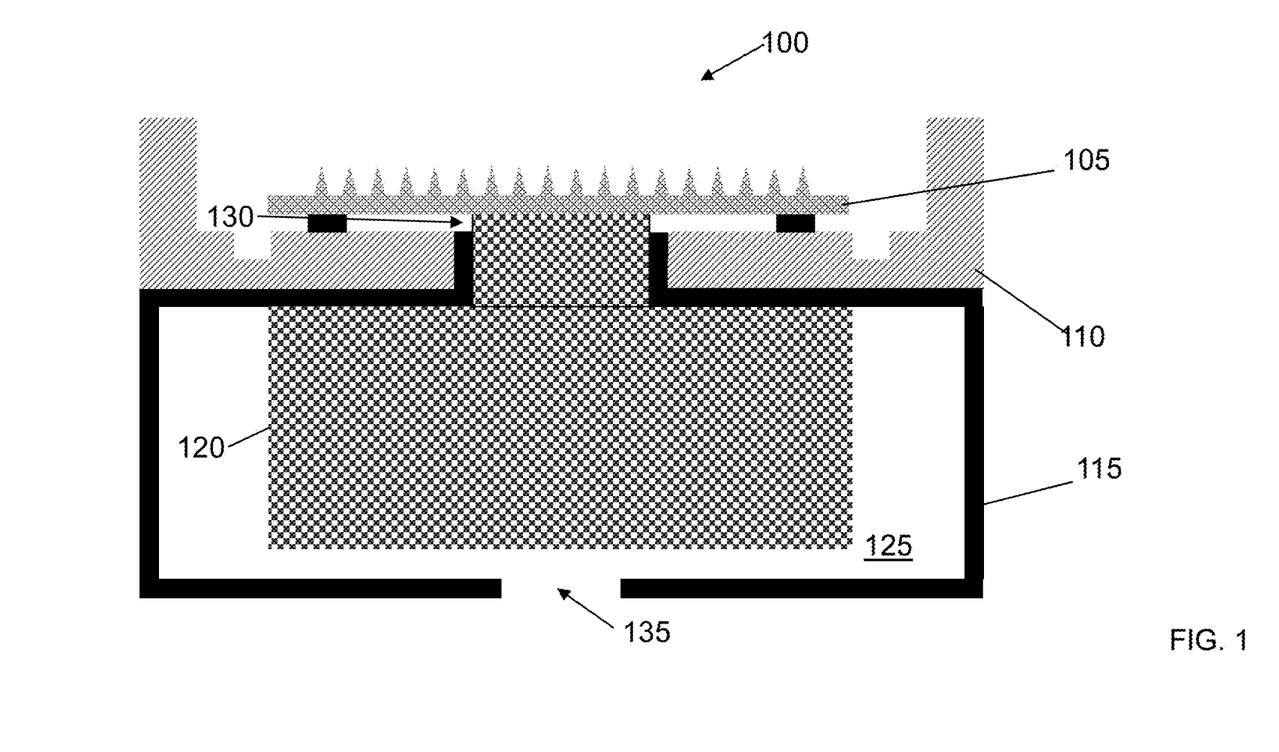
FIG. 1 is a cross-section view of an illustrative electrospray thruster assembly.

FIG. 1 is a cross-section view of an illustrative electrospray thruster assembly 100. Electrospray thruster assembly 100 includes porous emitter array 105. Porous emitter array 105 is mounted on emitter package 110. Emitter package 110 is mounted on tank 115. Porous reservoir material 120 is disposed in interior 125 of tank 115. Tank 115 includes a first opening 130 through which porous reservoir material 120 passes, permitting porous emitter array 105 to be disposed against and in fluid communication with porous reservoir material 120. Tank 115 also includes second opening 135 for adding propellant (e.g., ionic liquid) to tank 115.

In some embodiments, each of the porous emitter array 105 and porous reservoir material 120 can include a pore size gradient that decreases in the direction from porous reservoir material 120 to porous emitter array 105, such that ionic liquid can be transported from porous reservoir material 120 to porous emitter array 105 through capillarity. For example, porous emitter array 105 can have smaller-sized pores than porous reservoir material 120. In some embodiments, porous emitter array 105 and porous reservoir material 120 imbibe propellant in tank 115.

In some embodiments, emitter array 105 can be fabricated from a dielectric material (e.g., a polymeric, ceramic, glass, sol-gel, xerogel, aerogel, or other oxide material). In some embodiments, the emitter array 105 can be fabricated from a metal material (e.g., silver, stainless steel, tungsten, nickel, magnesium, molybdenum, titanium, any combination thereof, or any of these metals coated with a noble metal material such as platinum or gold). In some embodiments, porous reservoir material 120 can be fabricated from a dielectric material (e.g., a ceramic, glass, or other oxide material). In some embodiments, porous reservoir material 120 can be fabricated from a polymeric material (e.g., a polyurethane, or other open cell foam material). In some embodiments, porous reservoir material 120 can be made from a metal material (e.g., silver, stainless steel, tungsten, nickel, magnesium, molybdenum, titanium, any combination thereof, or any of these metals coated with a noble metal material such as platinum or gold). Tank 115 can be fabricated from any material that is impermeable by the propellant (e.g., ionic liquid), such as PEEK, PTFE or other impermeable compatible materials.

In operation, electrospray thruster assembly 100 can use porous emitter array 105 to emit ions, which can provide thrust (e.g., to move small satellites). Ions are delivered to the tips of porous emitter array 105 in the form an ionic liquid that is transported to the tips by, e.g., capillary forces. The operation of electrospray thrusters is described in greater detail in U.S. application Ser. No. 13/839,064, filed Mar. 15, 2013, the contents of which are hereby incorporated by reference. As described above, porous emitter array 105 can imbibe ionic liquid during operation. In some embodiments, approximately perfect imbibation of the ionic liquid can beneficially increase performance of electrospray thruster assembly 100 (e.g., by more efficiently producing thrust) and mitigate contamination of the porous materials. In some embodiments, approximately perfect imbibation of the ionic liquid can extend the lifetime of electrospray thruster assembly 100. Poor imbibition (e.g., when gas is trapped within the pores of porous emitter array 105 and/or porous reservoir material 120) can reduce the efficiency and lifespan of electrospray thruster assembly 100. The technology described herein can improve imbibition by porous emitter array 105 and/or porous reservoir material 120.

Filling Thruster with Propellant

In some embodiments, the technology can be used to add propellant to an electrospray thruster assembly (e.g., electrospray thruster assembly 100). As will be described in greater detail below, and with reference to the figures, a beaker with a breakaway bottom can be used to fill the tank of an electrospray thruster while it is under vacuum. After the propellant is introduced into the tank, the pores of the porous materials in the electrospray thruster can be filled with propellant and the electrospray thruster can then be placed under atmospheric pressure. The tank can then be sealed with a cap. In some embodiments, the tank can be vented to allow gases to enter and leave the tank in response to pressure changes in the surrounding environment.

Figure 2:
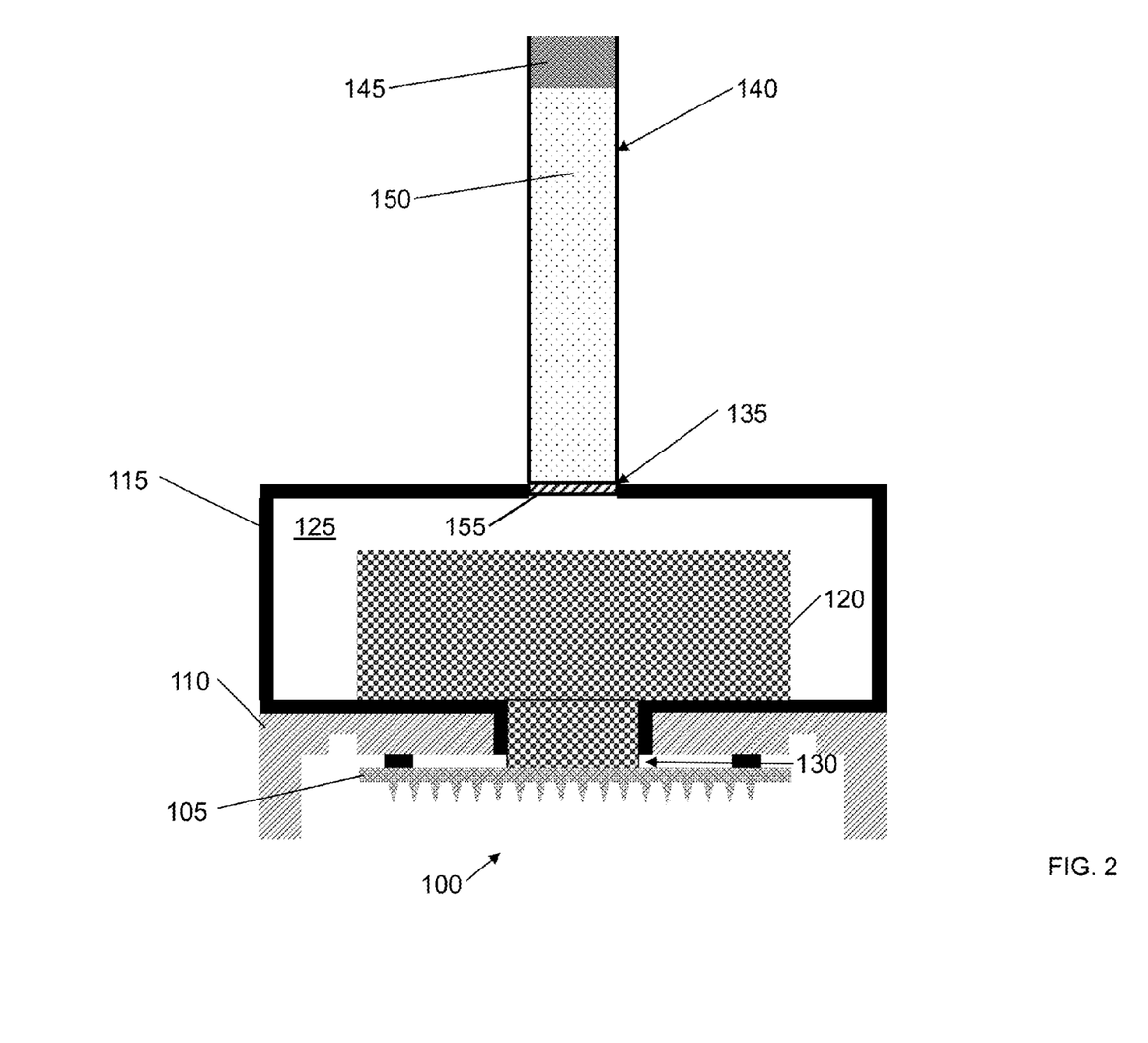
FIG. 2 is a cross-section view of the electrospray thruster assembly and a beaker.

FIG. 2 is a cross-section view of electrospray thruster assembly 100 and beaker 140. Beaker 140 can be made of Teflon, glass, or any other appropriate materials (e.g., materials that do not interact or react with the propellant). Beaker 140 can be permeable to gases but not to propellant. Beaker 140 includes breakaway bottom 155. In some embodiments, breakaway bottom 155 can be made from, e.g., Teflon tape. Beaker 140 further includes plunger 145. Plunger 145 can be made from, e.g., Stainless steel. Plunger 145 can be permeable to gases. Breakaway beaker 140 can be filled with propellant 150. While breakaway bottom 155 is intact, beaker 140 can retain propellant 150. As illustrated, the end of beaker 140 with breakaway bottom 155 can be disposed over and/or in second opening 135 of tank 115.

Figure 3:
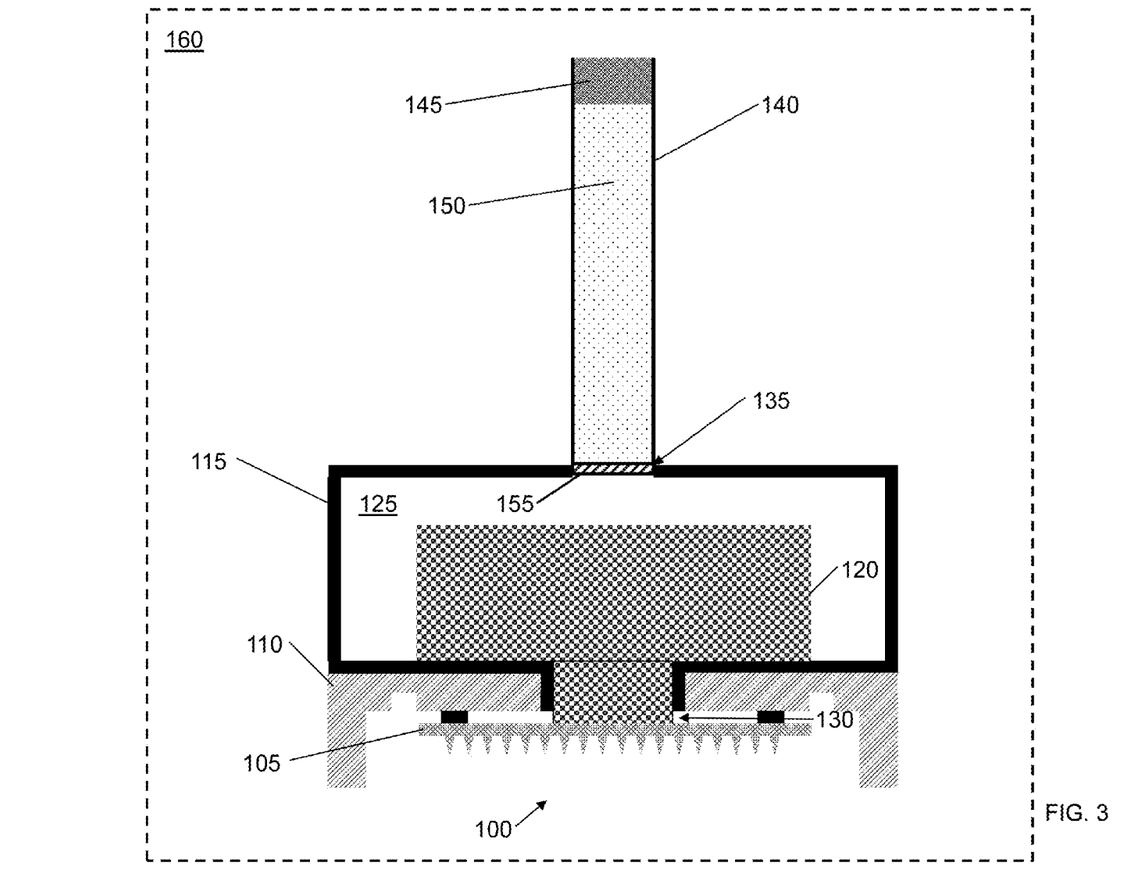
FIG. 3 is a cross-section view of the electrospray thruster assembly and the beaker in a vacuum chamber.

FIG. 3 is a cross-section view of electrospray thruster assembly 100 and beaker 140 in vacuum chamber 160. In accordance with the technology, electrospray thruster assembly 100 and beaker 140 can be placed in vacuum chamber 160 to place electrospray thruster assembly 100 and beaker 140 under vacuum. In some embodiments, electrospray thruster assembly 100 and beaker 140 can be put under vacuum in vacuum chamber 160 for an amount of time sufficient to remove gas trapped in the parts of electrospray thruster assembly 100 (e.g., including inside porous emitter array 105, propellant 150, and porous reservoir material 120). In some embodiments, the pressure in the vacuum chamber can be monitored to determine when substantially all of the trapped gas has been removed. For example, as gas is released from porous emitter array 105, propellant 150, or porous reservoir material 120, the pressure in the vacuum chamber can fluctuate (e.g., when a small amount of trapped gas is released, the pressure in the vacuum chamber can go from 1e-7 to greater than 1e-6 Torr). In some embodiments, the subsiding of such fluctuations indicates substantially all of the trapped gas has been removed. In some embodiments a residual gas analyzer can monitor the chamber to determine when substantially all of the trapped gas has been removed. In some embodiments, electrospray thruster assembly 100 and beaker 140 can be placed in an environment composed substantially of gases that can be absorbed by the propellant instead of a vacuum.

Figure 4:
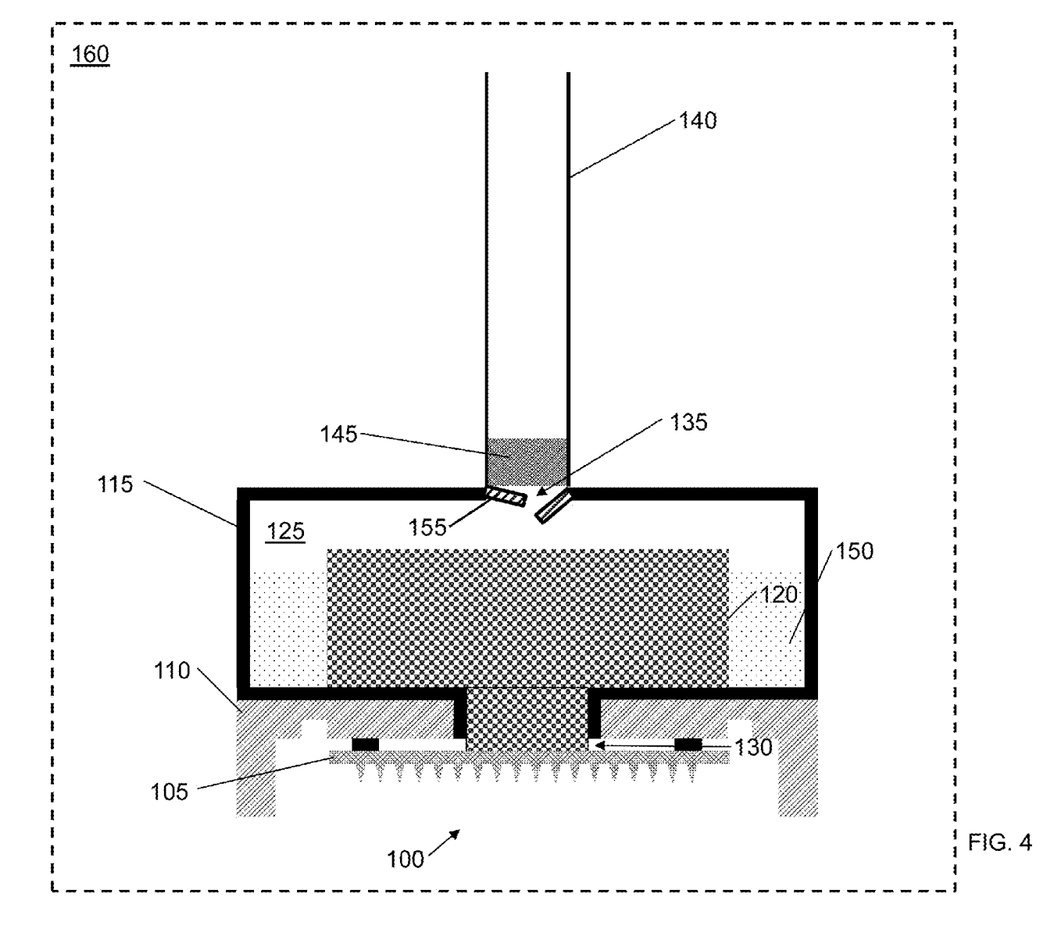
FIG. 4 is a cross-section view of the electrospray thruster assembly and the beaker in a vacuum chamber after a plunger has been depressed.

Once gas has been substantially evacuated from vacuum chamber 160, plunger 145 can be depressed. In accordance with the technology, depressing plunger 145 can cause breakaway bottom 155 to break and force propellant 150 into tank 115. In some embodiments, the pressure created by compressing propellant 150 with plunger 145 can cause breakaway bottom 155 to break. In some embodiments, plunger 145 can be configured to pierce breakaway bottom 155 when depressed. In some embodiments, plunger 145 can be configured to extend into tank 115 to compress porous reservoir material 120 so that porous reservoir material 120 is submerged in propellant 150. In some embodiments, after the emitter has imbibed propellant, plunger 145 can be further configured to retract back into the beaker to allow the reservoir material 120 to sponge up (or imbibe) the propellant 150. FIG. 4 is a cross-section view of electrospray thruster assembly 100 and beaker 140 in vacuum chamber 160 after plunger 145 has been depressed. As illustrated, after breakaway bottom 155 breaks, propellant 150 can enter tank 115 of electrospray thruster assembly 100. Beneficially, the pores of porous emitter array 105 and porous reservoir material 120 are evacuated so gas is not trapped in the pores when propellant 150 is added to tank 115.

Figure 5:
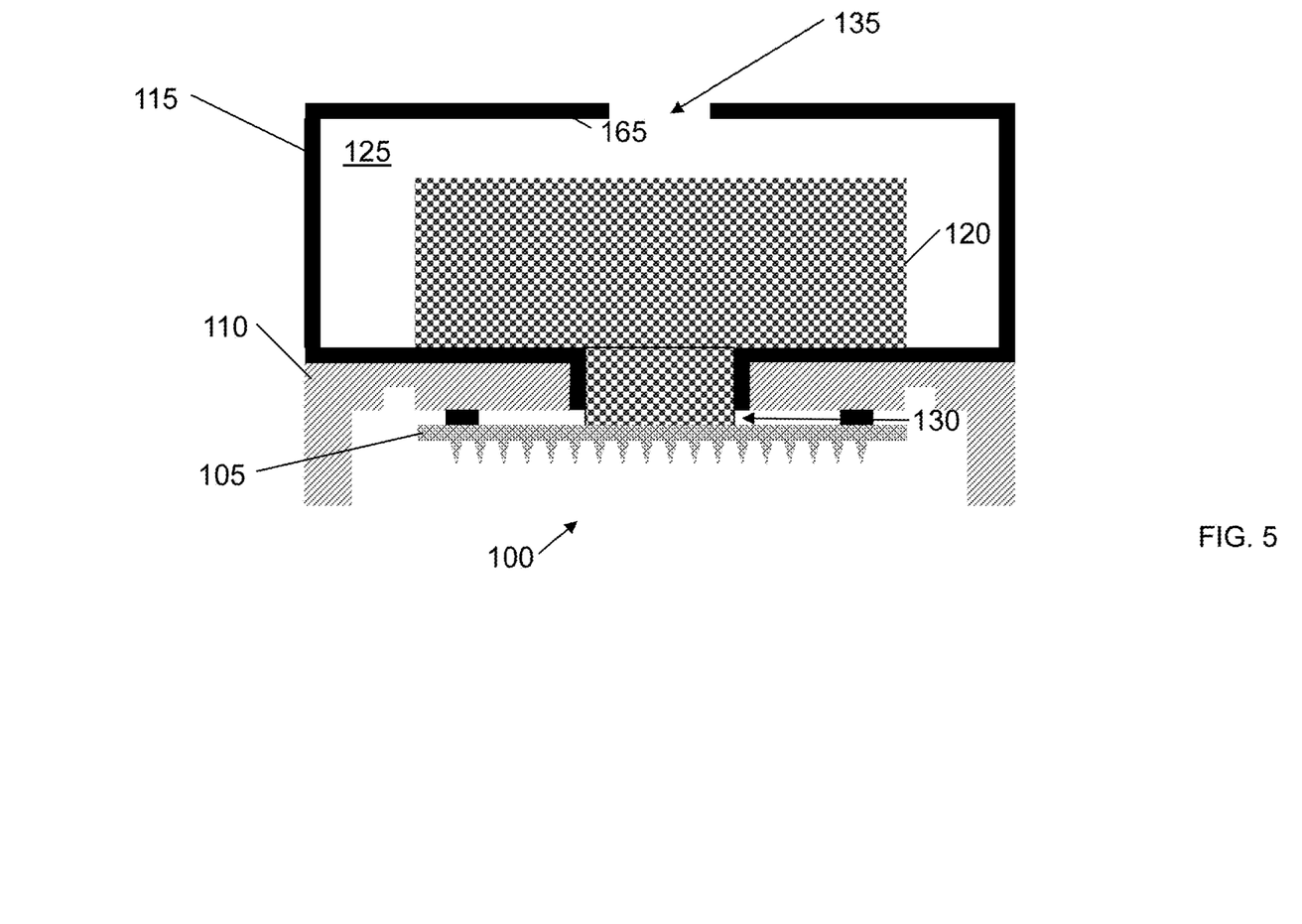
FIG. 5 is a cross-section view of the electrospray thruster assembly exposed to atmospheric pressure.

After propellant 150 fills tank 115 of electrospray thruster assembly 100, vacuum chamber 160 can be vented to expose electrospray thruster assembly 100 to atmospheric pressure, and beaker 140 and plunger 145 can be removed. In some embodiments, when vacuum chamber 160 is vented, plunger 145 can be in a piercing position (e.g., approximately aligned with breakaway bottom 155), a retracted position (e.g., retracted into beaker 140) or an extended position (e.g., extending into tank 115). When beaker 140 and plunger 145 are removed, porous reservoir material 120 can sponge up propellant 150. FIG. 5 is a cross-section view of electrospray thruster assembly 100 exposed to atmospheric pressure. Beneficially, the external atmospheric pressure can collapse voids inside porous emitter array 105 and porous reservoir material 120 created when propellant 150 filled tank 115 while under vacuum. As illustrated, propellant 150 has been sponged up by and is contained within porous emitter array 105 and porous reservoir material 120. Further, propellant 150 can prevent atmospheric gases such as $N_2$ from entering porous emitter array 105 and porous reservoir material 120. Instead, atmospheric gas can be trapped in second opening 135 and/or the space between porous reservoir material 120 and interior wall 165 of tank 115.

Figure 6:
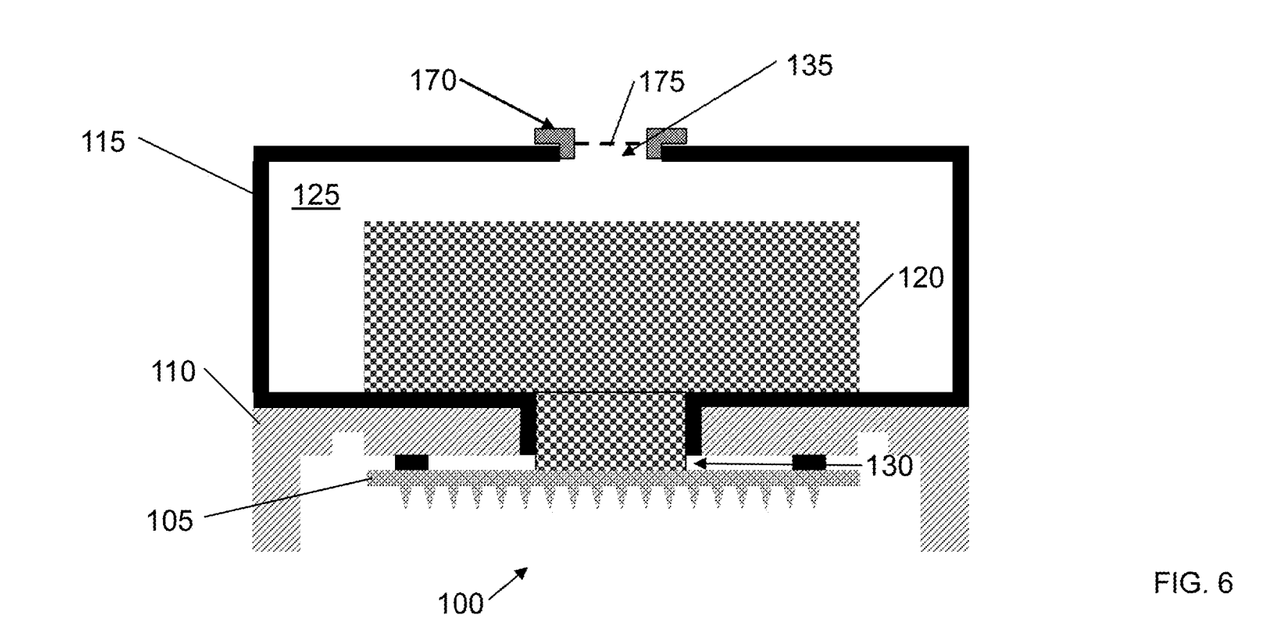
FIG. 6 is a cross-section view of the electrospray thruster assembly with a cap.

Propellant 150 can absorb atmospheric gases such as $CO_2$ and $H_2O$. When thruster assembly 100 is again subjected to a low-pressure or vacuum environment (e.g., when incorporated into a satellite in space), some of the absorbed gases in propellant 150 can be released. Embodiments of the technology incorporate venting to permit the released gases to escape tank 115. FIG. 6 is a cross-section view of electrospray thruster assembly 100 with cap 170 sealing second opening 135. In the illustrated embodiment, cap 170 can be inserted over and/or in second opening 135 to seal tank 115. Cap 170 can be attached with epoxy, sealed with an o-ring and/or any other pressure tight seal. Cap 170 includes at least one porous membrane 175 that permits gas to enter and leave tank 115 in response to pressure changes. For example, gas released from propellant 150 can move through the space between porous reservoir material 120 and interior wall 165 of tank 115 to exit tank 115 through porous membrane 175 of cap 170. Cap 170 can include a barrier to prevent porous membrane 175 from being blocked by, sealed to, or in contact with propellant-filled reservoir 120. Porous membrane 175 can be made from a porous material that is non-wettable by the propellant. In some embodiments, porous material can be made from Teflon, peek or polyethylene. In some embodiments, porous membrane 175 can be made of more than one layer of porous material. In some embodiments, porous membrane 175 can be a made of multiple layers of porous materials that are spaced apart to prevent fluid flow from one to the next while still allowing gas transport. In some embodiments, the pore size of porous membrane 175 can be larger than the pore size of emitter array 105. This can prevent gas inside tank 115 from causing the ejection of propellant 150 from emitter array 105. Beneficially, this can allow electrospray thruster assembly 100 to be exposed to a variety of atmospheric conditions while substantially eliminating leakage of propellant 150 outside of tank 115.

Figure 7:
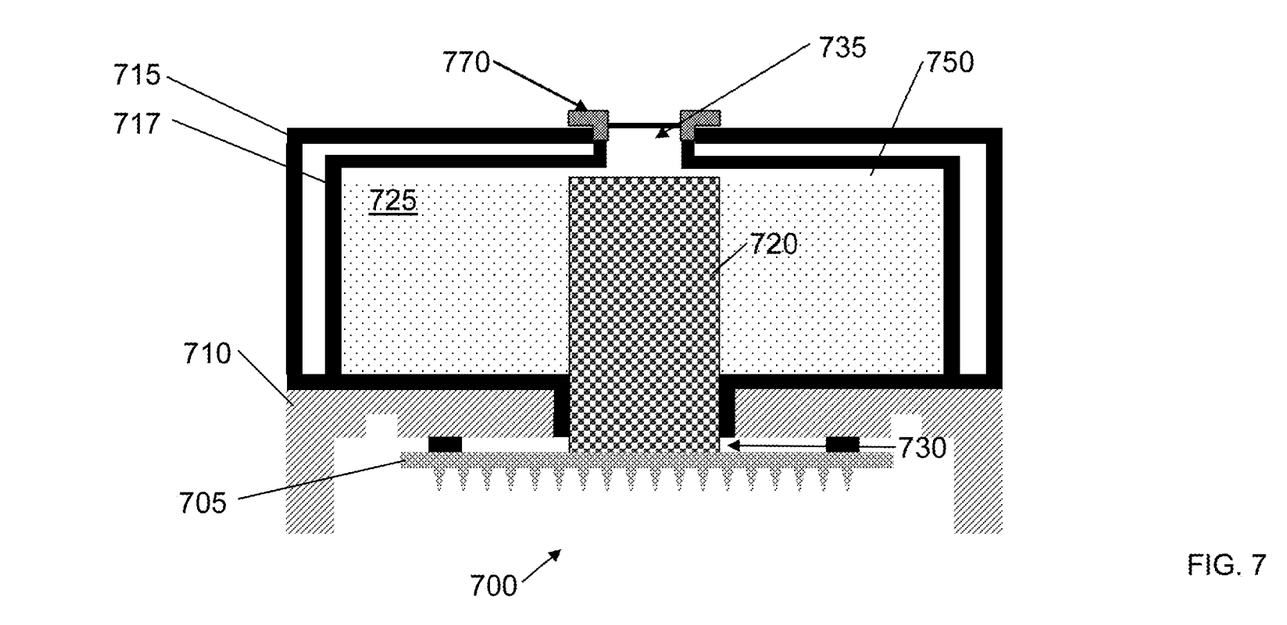
FIG. 7 is a cross-section view of an electrospray thruster assembly.

Other embodiments are contemplated to permit venting of gases. In some embodiments, a portion or substantially the entire tank (e.g., tank 115) can be made of a porous material that is impermeable to the propellant, e.g., porous PTFE, hydrophobic sol-gel (aerogel or xerogel). In some embodiments, a permeable propellant container can be contained within an outer tank. FIG. 7 is a cross-section view of electrospray thruster assembly 700. Container 717 is disposed in tank 715. Container 717 can be filled with propellant 750 as described above. In the illustrated embodiment, propellant 750 resides in tank 717 and porous material 720 can serve as a wick to deliver propellant 750 to porous emitter array 705 (e.g., via capillarity). Container 717 can be made of a porous material that is impermeable to the propellant to permit gas to enter and leave container 717. In some embodiments, container 717 can be composed of multiple porous materials that can be spaced apart to prevent fluid flow from one to the next while still allowing gas transport. Tank 715 can be made of a porous material that is impermeable to the propellant to permit gas to enter and leave tank 715. In some embodiments, the pore size of tank 715 and/or container 717 can be larger than the pore size of emitter array 705. This can prevent gas inside tank 715 and/or container 717 from causing the ejection of propellant 750 from emitter array 705.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method of adding propellant to a thruster assembly, wherein the thruster assembly comprises a tank comprising a first opening and a second opening;
   a porous emitter array disposed over the first opening;
   a porous reservoir disposed within an interior of the tank, wherein the porous reservoir is in fluid communication with the porous emitter array through the first opening, the method comprising:
   disposing a first end of a beaker in the second opening of the tank, wherein the beaker contains the propellant, and wherein the first end of the beaker comprises a breakaway bottom;
   placing the thruster assembly and beaker in a first environment, wherein the first environment is at least one of a vacuum or an environment composed of gases that can be absorbed by the propellant;
   depressing a plunger in the beaker to cause the breakaway bottom of the beaker to break and cause the propellant to flow into the tank;
   removing the thruster assembly from the first environment; and
   removing the beaker from the second opening.

2. The method of claim 1, further comprising:
   affixing a cap to the second opening of the tank.

3. The method of claim 2, wherein the cap comprises a porous membrane that permits gas to pass therethrough and blocks the propellant from passing therethrough.

4. The method of claim 3, wherein first pores of the porous membrane are larger than second pores of the porous emitter array.

5. The method of claim 3, wherein the porous membrane is made from at least one of polytetrafluoroethylene, PEEK and polyethylene.

6. The method of claim 1, wherein the tank comprises a porous membrane that permits gas to pass therethrough and blocks the propellant from passing therethrough.

7. The method of claim 1, further comprising:
   extending the plunger into the tank to compress the porous reservoir, thereby at least partially submerging the porous reservoir in the propellant; and
   retracting the plunger from the tank.

8. An assembly comprising:
   a thruster assembly comprising:
      a tank comprising a first opening and a second opening;
      a porous emitter array disposed over the first opening; and
      a porous reservoir disposed within an interior of the tank,
   wherein the porous reservoir is in fluid communication with the porous emitter array through the first opening;
   a beaker having a first end comprising a breakaway bottom, wherein the first end of the beaker is disposed in the second opening,
   wherein prior to the breakaway bottom breaking, liquid propellant is retained in the beaker, and wherein when the breakaway bottom breaks, the liquid propellant flows into the tank.

9. The assembly of claim 8, wherein the beaker is filled with the liquid propellant, the assembly further comprising:
   a plunger disposed in the beaker to cause the breakaway bottom of the beaker to break and cause the liquid propellant to flow into the tank when depressed.

10. The assembly of claim 8, wherein the beaker is selectively removable from the second opening.

11. The assembly of claim 8, wherein the breakaway bottom is constructed and arranged such that when the breakaway bottom is broken, the beaker is removable from the second opening.

12. The assembly of claim 8, wherein the beaker is filled with liquid propellant disposed between the second opening and a plunger, and wherein the plunger is depressible toward the second opening.

13. The assembly of claim 8, wherein the porous reservoir is adapted to transport the liquid propellant to the porous emitter array through capillarity.

14. A thruster assembly comprising:
   a tank comprising a first opening and a vent;
   a porous emitter array disposed over the first opening;
   a porous reservoir disposed within an interior of the tank, wherein the porous reservoir is in fluid communication with the porous emitter array through the first opening; and
   a liquid propellant disposed within the porous reservoir, wherein the vent comprises a porous membrane that permits gas to pass therethrough and blocks the liquid propellant from passing therethrough.

15. The thruster assembly of claim 14, wherein first pores of the porous membrane are larger than second pores of the porous emitter array.

16. The thruster assembly of claim 14, wherein the porous membrane is made from at least one of polytetrafluoroethylene, PEEK and polyethylene.

17. A thruster assembly comprising:
   a tank comprising a first opening, wherein the tank is formed from one or more semi-permeable materials that permits gas to pass therethrough and blocks a liquid propellant from passing therethrough;
   a porous emitter array disposed over the first opening;
   a porous reservoir disposed within an interior of the tank, wherein the porous reservoir is in fluid communication with the porous emitter array through the first opening; and
   the liquid propellant disposed within the porous reservoir.

18. The thruster assembly of claim 17, wherein first pores of the tank are larger than second pores of the porous emitter array.

19. The thruster assembly of claim 17, wherein the tank is formed from at least one of porous polytetrafluoroethylene (PTFE) and hydrophobic solgel.

20. The thruster assembly of claim 17, further comprising:
   a propellant container disposed within the interior of the tank, wherein the propellant container is formed from another one or more semi-permeable materials that permit gas to pass therethrough and block the liquid propellant from passing therethrough; and
   wherein the porous reservoir is disposed within an interior of the propellant container.

21. The thruster assembly of claim 20, wherein first pores of the propellant container are larger than second pores of the porous emitter array.

22. The thruster assembly of claim 21, wherein the propellant container is formed from at least one of porous polytetrafluoroethylene and hydrophobic solgel.

23. The assembly of claim 12, wherein depressing the plunger toward the second opening causes the liquid propellant to flow into the tank.

* * * * *